DIRECTIONAL MICROPHONE

Filed May 18, 1954

INVENTOR.
Harry F. Olson
BY Morris A. Rabkin
ATTORNEY

United States Patent Office 2,854,511 Patented Sept. 30, 1958

2,854,511

DIRECTIONAL MICROPHONE

Harry F. Olson, Princeton, N. J., assignor to Radio Corporation of America, a corporation of Delaware Application May 18, 1954, Serial No. 430,620

11 Claims. (Cl. 179—1)

This invention relates to microphones, and more particularly to microphones having high directivity.

Radio broadcasting in general and television broadcasting in particular, as well as motion picture recording require uni-directional microphones, which discriminate against unwanted sound. Such unwanted sound may be the reverberant sound, unavoidable background noises or camera noises. The directivity of a microphone is the primary characteristic which determines how far the microphone may be placed from a performer in any given environment. The directivity of ordinary microphone is generally very poor and limits the distance from the performer so that the microphone usually must be placed just out of camera range.

In many cases, it is desirable to obtain increased directivity by the use of electronic circuits, rather than by a system employing a large number of microphones, wherein the microphone outputs are mixed to obtain higher gradient operation and certain desired directional characteristics.

In accordance with the present invention, directional sound translating means are used, which may be, for example, a velocity microphone and a uni-directional microphone. The bi-directional cosine characteristic output of the velocity microphone is multiplied by the uni-directional characteristic cardioid output characteristic of the uni-directional microphone. This multiplication results in a much higher order of directivity than the cosine characteristic of the bi-directional microphone or the cardioid characteristic of the uni-directional microphone.

It is an object of this invention to provide an improved sound translating system, wherein high directivity is obtained through the use of auxiliary electronic circuits.

It is a further object of this invention to provide an improved directional microphone which has a minimum number of critical components.

It is still a further object of this invention to provide an improved directional microphone system, which is relatively simple and easy to construct.

Other objects and advantages of the present invention will become apparent and suggest themselves to those skilled in the art to which the invention is directed from a reading of the following specification in connection with the accompanying drawing, in which:

Figure 1 illustrates a general system embodying the present invention;

Figures 2*a*, 2*b* and 2*c* illustrate the directional patterns of microphones used in Figure 1;

Figure 1:
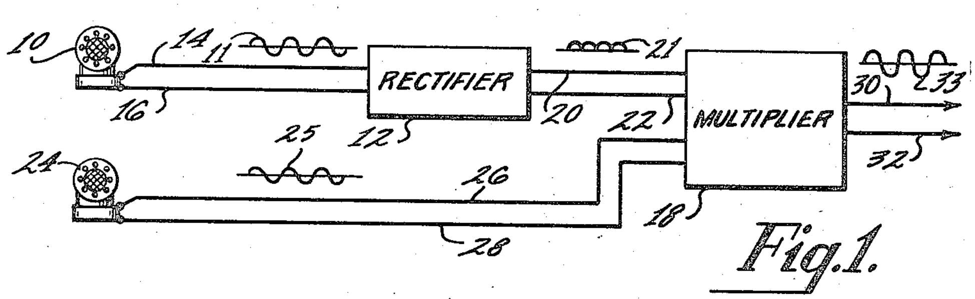
Figures 2A, 2B, 2C:
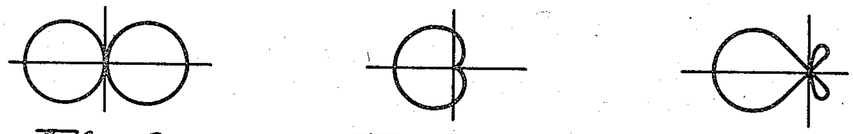

Referring to Figures 1 and 2, the output signal of a velocity microphone 10, represented by a curve 11, is applied to a rectifier 12 through a pair of conductors 14 and 16. The directional pattern of the microphone is illustrated in Figure 2*a*. The rectified signal output of the rectifier illustrated by the curve 21, is applied to a multiplier 18 through a pair of conductors 20 and 22. Multipliers and their mode of operation will be later described, by way of example, in connection with Figures 4 and 5 of the drawing. Filtering may be employed after rectification to give a flat response, rather than a ripple response shown by the curve 21.

The signal output from a uni-directional microphone 24, illustrated by the curve 25, is applied to the multiplier through a pair of conductors 26 and 28. The directional response pattern of this microphone is shown in Figure 2*b*.

The signal output of the multiplier 18, illustrated by the curve 33, may be applied to a utilization circuit (not shown) through a pair of conductors 30 and 32. It is seen that the signal output of the multiplier is essentially the same shape output from the uni-directional microphone, represented by the curve 25, although the amplitude has been increased. This increase in amplitude, which results from the multiplication of the signal voltage of the uni-directional microphone by the signal voltage of the bi-directional microphone provides a voltage having directional pattern, illustrated in Figure 2*c*, in the output circuit of the multiplier. It is noted that the directional pattern shown in Figure 2*c* is much narrower than directional pattern shown in Figure 2*b*. In effect, a novel directional microphone is provided by the system shown by way of example in Figure 1 employing two sound translating means, namely, the microphone 10 and the microphone 24.

It will be understood by those skilled in the art that the single microphone 24 may be replaced by the combined outputs of velocity microphone and a non-directional microphone. Also, it will be understood by those skilled in the art from what is stated herein that a microphone having a sharply directional characteristic to serve as the microphone 24 may be provided by the entire system Figure 1 so that the arrangement of Figure 1, in effect, is used in cascade arrangement.

If desired, the entire system, shown in Figure 1, may also be used in place of microphone 10, or in place of both microphones 10 and 24. In these cases, high directivity may be attained, with an output characteristic narrower than that shown in Figure 2*c*.

It will also be recognized that any two uni-directional microphones, or a combination of any type of uni-directional and bi-directional microphone may be employed in the present system to attain an increased directivity output characteristic from a multiplier.

Figure 3:
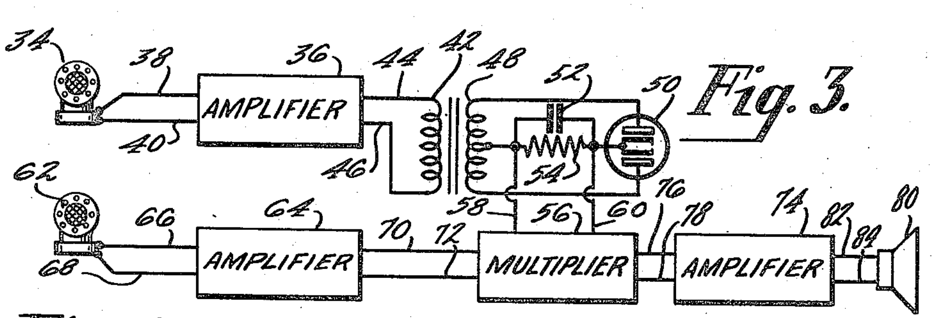
Figure 3 is a schematic diagram showing an embodiment of the present invention.

Referring to Figure 3, there is illustrated an example of a rectifying circuit, which may be used in a system embodying the present invention. The signal output from a velocity microphone 34 is applied to an amplifier 36 through a pair of conductors 38 and 40. The signal output voltage from the amplifier 36 is applied to the primary winding 42 of a transformer through conductors 44 and 46. The secondary winding 48 of the transformer is connected across the plates of a full wave rectifier 50. The voltage output from the rectifier is filtered by a capacitor 52 and a resistor 54 and applied to a multiplier 56 through conductors 58 and 60.

The signal output from a uni-directional microphone 62 is applied to an amplifier 64 through conductors 66 and 68. After amplification, the voltage output is applied to the multiplier through the conductors 70 and 72. The combined voltage output of the multiplier is then applied to an amplifier 74 through conductors 76 and 78, The amplifier output circuit is connected to a utilization circuit, shown here as a loudspeaker 80 through conductors 82 and 84.

The directional pattern of the microphone 34 is shown in Figure 2*a*. The directional pattern of the microphone 62 is that shown in Figure 2*b*. Again the combined output pattern of the system is illustrated in Figure 2*c*. It will be understood by those skilled in the art from what is stated herein that any means of rectifying the voltage output from the microphone 34 may be employed. Rectification in this case is a step utilized to transfer the voltage into a convenient form in order to utilize it in a multiplication circuit. It is, of course, possible to use the voltage output from the microphone 34 in a multiplication circuit without rectifying it, although such a system may be more involved.

Figures 4, 5, 6:
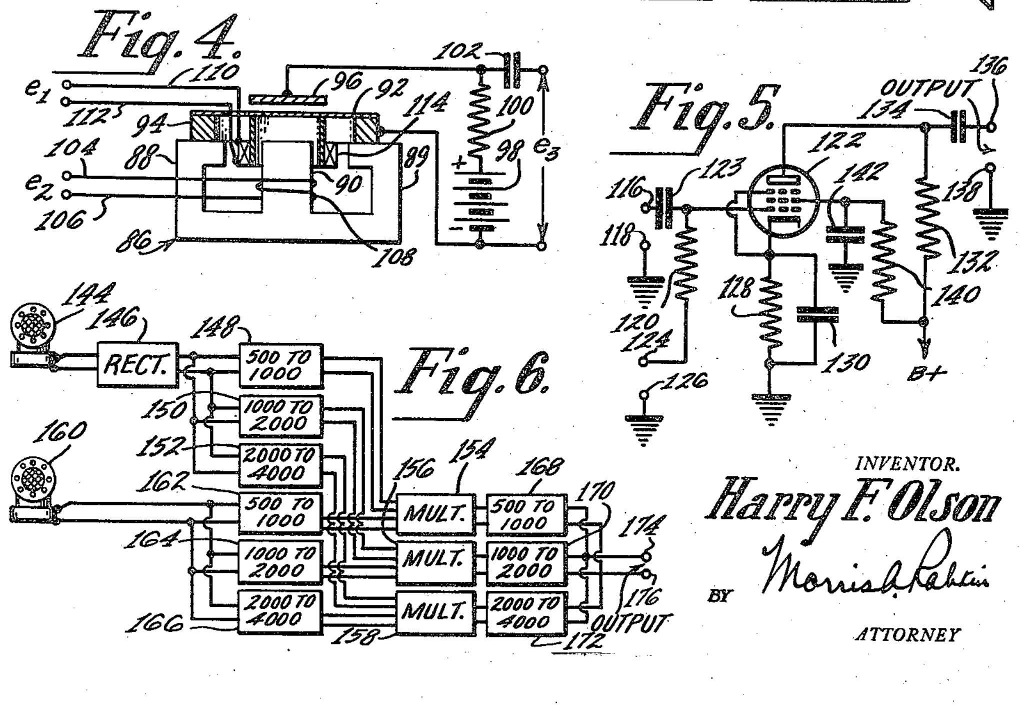
Figure 4 shows one form of multiplier which may be used, in accordance with the present invention.
Figure 5 is a schematic diagram illustrating another form of multiplier which may be used, in accordance with the present invention; and, Figure 6 is a diagram illustrating a system embodying the present invention.

Referring particularly to Figure 4, there is shown a multiplier which may be used in the systems described in connection with Figures 1 and 3. The device illustrated here operates in a manner similar to the operation of a condenser type microphone, and employs a magnetic structure 86 similar to that of known loudspeakers. The magnetic structure 86 is provided with a pair of pole pieces 88, 89 and a core member 90. A diaphragm 92 is mounted on a ring 94, which may be attached to the magnetic structure or any stationary part by any suitable means. The diaphragm acts as one plate of a capacitor. An element 96 serves as the other plate of a capacitor. It is seen that when the diaphragm is vibrated, the air gap between the diaphragm and the element 96 is varied, thereby varying the capacitance therebetween. An initial bias voltage is provided across the capacitor by means of a battery 98. When a change is made in the capacitance, it causes a current to flow in a resistor 100. The varying voltage across this resistor is then applied to a utilization circuit (not shown) through a capacitor 102.

The output voltage from the uni-directional microphone, designated as $e_1$ is applied through the conductors 110 and 112 to a winding 114 disposed in the air gap. The voltage output from the velocity microphone, designated as $e_2$, is applied through the conductors 104 and 106 to a winding 108. The windings 108 and 114 may be compared to a field winding and a voice coil winding in a loudspeaker arrangement.

The flux density in the air gap may be found by the formula:

$$(1) \qquad B=\frac{4\pi e_2 N}{R_2 R A}$$

where B is the flux density, $e_2$ is the voltage applied to the field winding 108, $R_2$ is the resistance of the winding 108, R is the reluctance of the air gap and field structure, A is the area of the air gap and N is the number of turns in the winding 108.

The force on the diaphragm 92 may be found by the formula:

$$f_m=Bli=Bl\frac{e_1}{R_1}$$

where $f_m$ is the force on the diaphragm, $l$ is the length of the conductor, $i$ is the current in the conductor, $e_1$ is the voltage applied to the winding 114 and $R_1$ is resistance of the coil winding 114.

The amplitude movement of the diaphragm 92 is given by the formula:

$$(2) \qquad x=\frac{f_m}{Z_m\omega}$$

where $x$ is the amplitude, $Z_m$ is the mechanical impedance of the vibratory system and $\omega$ is equal to $2\pi f$.

From the above formulas, it may be seen that $$(3) \qquad x=\frac{Ble_1}{R_1 Z_m\omega}=\frac{4\pi e_2 N l e_1}{R_1 R_2 R A Z_m \omega}$$

$$(4) \qquad x=C_1 e_1 e_2$$

where $C_1$ represents the expression $$\frac{4\pi N l}{R_1 R_2 R A Z_m \omega}$$

The voltage output from the system is then:

$$(5) \qquad e_3=C_2 x$$

where $C_2$ is the constant of the condenser transducer $$(6) \qquad e_3=C_3 e_1 e_2$$

where $C_3=C_1C_2$.

It is seen that when this arrangement is used that the voltage output from a uni-directional microphone is multiplied by the voltage output from a velocity type microphone.

When the voltage output from a velocity microphone, having a directional pattern illustrated by Figure 2*a*, is applied to the winding 108, either with or without rectification, and the voltage output from a uni-directional microphone, having a directional pattern illustrated by Figure 2*b*, is applied to the winding 114, the resulting directional pattern will be that shown in Figure 2*c*.

Referring now to Figure 5, there is shown another form of multiplier which may be used in this invention. The output from a uni-directional microphone may be applied to the terminals 116 and 118. The resulting voltage is applied to the grid-cathode circuit of an amplifier tube 122 through a coupling capacitor 123. This voltage is then amplified in the usual manner. At the same time the voltage output from the velocity microphone after rectification and filtering is applied to the input terminals 124 and 126. The gain of the amplifier tube is controlled by this D. C. voltage, since it is also applied through a resistor 120 across the grid-cathode circuit of the amplifier tube 122. This arrangement is similar to an automatic gain control system which may be employed in radio circuits, wherein a rectified voltage is used to vary the gain of an amplifier tube to maintain relatively constant output for a varying input.

It is seen that voltage of the uni-directional microphone which is applied to the amplifier tube is varied, or multiplied, by the rectified voltage output of the velocity microphone. Such a multiplication gives an improved directional pattern over that of a uni-directional microphone used alone, as shown in Figures 2*a*, 2*b* and 2*c*.

In any case where the amplifier or multiplication system is not linear, and in general produces expansion, a volume compression circuit may be employed after amplification. Such volume compressor circuits are well-known in the art.

The remaining portion of the amplifier circuit provides a resistor 128 and a capacitor 130 for self-biasing the amplifier tube. A resistor 132 constitutes the load for the amplifier tube and a capacitor 134 provides the means for coupling the amplifier output voltage to the output terminals 136 and 138, which may be connected to a utilization circuit. A resistor 140 provides a voltage drop for the screen circuit and a capacitor 142 is a screen by-pass capacitor.

Referring now to Figure 6, there is shown a sound translating system utilizing a set of octave band pass filters. The band pass filters may be greater than the number shown to cover any desired total frequency range. These filters are necessary to minimize any distortion which may be introduced into the system.

The voltage output from a velocity microphone 144 is applied to a rectifier 146. The rectified voltage is then applied to filters 148, 150 and 152. Each of these filters is designed to pass a certain octave covering the frequencies indicated within the blocks. The outputs from the filters 148, 150 and 152 are applied to multipliers 154, 156 and 158, respectively.

The voltage output from the uni-directional microphone 160 is applied to filters 162, 164 and 166. The outputs of the filters 162, 164 and 166 are applied to the multipliers 154, 156 and 158, respectively.

The combined outputs of the multipliers, 154, 156 and 158 are then applied to filters 168, 170 and 172, respectively. This second set of filters helps to minimize any distortion produced by the multiplication operation. The outputs of the filters 168, 170 and 172 are then combined and applied to a pair of output terminals 174 and 176. These output terminals may then be connected to a utilization circuit, such as a loudspeaker or an amplifier. Again, the multiplication of the voltage output from the velocity microphone 144 by the voltage output of the uni-directional microphone 160 results in a highly directional output pattern, such as illustrated in Figure 2*c*. A more detailed description of the band pass filters, embodied in this invention, may be found in an article entitled "Audio noise reduction circuits," written by the applicant and printed in the December 1947 issue of "Electronics."

What is claimed is:

1. A directional microphone comprising a first sound translating means having a predetermined directional response characteristic and including means to provide an output, a second sound translating means having a predetermined directional response characteristic and including means to provide an output, and means for multiplying the output of said first sound translating means by the output of said second sound translating means whereby to obtain increased directivity.

2. A sound translating system comprising a first directional microphone having a predetermined characteristic and having means for providing an electrical output, a second directional microphone having a predetermined characteristic and having means for providing an electrical output, and means for multiplying said electrical output of one of said microphones by said electrical output of the other of said microphones whereby increased directivity within said system is attained.

3. A sound translating system comprising a first directional microphone having a predetermined response characteristic having means for providing an electrical output, a second directional microphone having a predetermined response characteristic and means for providing an electrical output, means for multiplying said electrical output of one of said microphones by said electrical output of the other of said microphones, and said multiplying means having output terminals, the output appearing at said terminals having a characteristic representing a narrow directivity input characteristic to said sound translating system.

4. A directional microphone comprising two sound translating devices having predetermined directional response characteristics, each having means to provide an electrical output and means for multiplying the electrical output of one of said sound translating devices by the electrical output of the other of said sound translating devices.

5. A directional microphone comprising a first sound translating means having a bi-directional output characteristic, a second sound translating means having a uni-directional output characteristic, and means for multiplying the output of said second sound translating means by the output of said first sound translating means.

6. A directional microphone comprising a first sound translating means having a bi-directional output characteristic, a second sound translating means having a uni-directional output characteristic, means for rectifying the output from said first sound translating means, and means for multiplying the output of said second sound translating means by the rectified output of said first sound translating means.

7. A directional microphone comprising a first sound translating means having a bi-directional output voltage characteristic, a second sound translating means having a uni-directional voltage output characteristic, a rectifier to convert the voltage output from said first sound translating means into direct current voltage, means for filtering said direct current voltage, and means for multiplying the voltage output of said second sound translating means by the filtered voltage output from said rectifier.

8. A directional microphone comprising a velocity microphone having means to provide an output, a uni-directional microphone having means to provide an output, and means for multiplying the output of said uni-directional microphone by the output of said velocity microphone.

9. A directional microphone comprising a first sound translating means having a bi-directional output voltage characteristic, a second sound translating means having a uni-directional output voltage characteristic, means for converting said voltage output from said first sound translating means into a direct current voltage, means for multiplying the voltage output of said second sound translating means by said direct current voltage, said last named means including an amplifier having an input circuit, means for applying the output from said second sound translating means to said input circuit, and means for applying said direct current potential to said amplifier to control the gain thereof.

10. A directional microphone comprising a first sound translating means having a bi-directional output characteristic, a second sound translating means having a uni-directional output characteristic, means for multiplying the output of said second sound translating means by the output of said first sound translating means, said last named means including a magnetic structure, a field winding operatively associated with said structure, a winding movably disposed in close relationship to said structure, a diaphragm, means for connecting said movably disposed winding to said diaphragm, a plate member disposed in close relationship with said diaphragm to form a capacitor therewith, means for applying the output of one of said sound translating means to one of said windings, means to apply the output of the other of said sound translating means to the other of said windings to effect movement of said diaphargm, and a utilization circuit connected across said capacitor.

11. A directional microphone comprising a first sound translating means having a bi-directional voltage output characteristic, a second sound translating means having a uni-directional voltage output characteristic, means for converting the output of said first sound translating means into a direct current voltage, means for multiplying the output of said second sound translating means by the output of said first sound translating means, said last named means having an input and an output circuit, a band pass filter included between said first sound translating means and said input circuit, a band pass filter included between said second sound translating means and said input circuit, and a band pass filter connected in said output circuit.

References Cited in the file of this patent

UNITED STATES PATENTS

| | | |
|---|---|---|
| 2,293,258 | Harry | Aug. 18, 1942 |
| 2,309,109 | Hathaway | Jan. 26, 1943 |